United States Patent [19]

Ohtsuka et al.

[11] Patent Number: 5,064,791

[45] Date of Patent: Nov. 12, 1991

[54] METHOD OF PREPARING CERAMIC COMPOSITE POWDERS AND THE POWDERS OBTAINED THEREBY

[75] Inventors: Kunio Ohtsuka; Mitsuru Suda; Johji Koga, all of Saitama, Japan

[73] Assignee: Mitsubishi Mining & Cement Co., Ltd., Tokyo, Japan

[21] Appl. No.: 551,623

[22] Filed: Jul. 11, 1990

[30] Foreign Application Priority Data

Jul. 19, 1989 [JP] Japan ................................. 1-186311

[51] Int. Cl.$^5$ .............................................. C04B 33/00
[52] U.S. Cl. .................................... 501/147; 501/146; 427/217; 427/383.5
[58] Field of Search ................ 501/146, 147; 427/217, 427/383.5; 423/24

[56] References Cited

U.S. PATENT DOCUMENTS

| | | | |
|---|---|---|---|
| 4,600,604 | 7/1986 | Suita | 427/216 |
| 4,652,465 | 3/1987 | Koto et al. | 427/216 |
| 4,981,824 | 1/1991 | Yonemra et al. | 501/146 |

*Primary Examiner*—William R. Dixon, Jr.
*Assistant Examiner*—Chris Gallo
*Attorney, Agent, or Firm*—McAulay Fisher Nissen Goldberg & Nisen

[57] ABSTRACT

A manufacturing method for ceramic-ceramic composite powders including the steps of; forming a suspension by mixing an inorganic powder having a cation-exchange property with a solution containing one or more metal ions to conduct ion exchange with the metal ions on the surface of the inorganic powder; adding to the suspension a precipitant-forming material which releases an anion in a solution when heated or pressurized; heating or pressurizing the suspension to release the anion which reacts with the metal ions to thereby precipitate metal hydroxides, metal basic salts or metallic salts on the surface of the inorganic powder; and thereafter heating the inorganic powder with the resultant precipitates to convert the precipitates into metal oxides. Metal-ceramic composite powders are manufactured by reducing the above metal oxides on the surface of the inorganic powder to metal. In the composite powders any arbitrary amount of metal oxides or metal is supported on the surface of the inorganic powder.

18 Claims, No Drawings

METHOD OF PREPARING CERAMIC COMPOSITE POWDERS AND THE POWDERS OBTAINED THEREBY

BACKGROUND OF THE INVENTION

1. Field of the Invention

This invention relates to a method of preparing ceramic-ceramic composite powders in which ceramic components of a certain type are combined with other ceramic components, and metal-ceramic composite powders in which metal components are combined with ceramic components, and to the ceramic composite powders obtained thereby. More particularly, it relates to a method of enabling preparation of the composite powders in which any arbitrary amount of metal oxides or metal is supported on the surface of an inorganic powder.

2. Description of the Related Art

One typical method of synthesizing ceramic products includes the steps of weighing ingredients of a ceramic starting material in the respective amounts to obtain the predetermined composition, thoroughly mixing the components to obtain uniform distribution, and calcining the resultant mixture. According to this method, the calcined product must be pulverized and subjected to repeated mixing and calcining to obtain a sufficiently homogeneous composition.

Metal powders or ultrafine metal particles have conventionally been used extensively as conductive or magnetic materials without being supported by any particular powder. The prior art metal-ceramic composite materials such as oxide dispersion strengthened alloys, heat resisting structural materials and damping materials demonstrate their functions by dispersing the ceramic particles in the metallic matrix.

According to the above conventional method of synthesizing ceramic products, despite thorough mixing, it is difficult to obtain an ideally homogeneous composition of particles the diameter of which is in the order of 40 microns, because of aggregation of the component powders. In order to obtain a ceramic product having an ideally homogeneous composition, ceramic-ceramic composite powders having the predetermined composition should be used. However, no method has yet been found for synthesizing such ceramic-ceramic composite powders as are suitable for the purpose.

Use of metal powders or ultrafine metal particles not supported on any special powder is disadvantageous in that (1) their specific gravity is relatively high, (2) they are hard to disperse, (3) they are hard to handle, and (4) metal particles are easily sintered when exposed to heat. For example, when a metal powder is mixed with an organic binder to obtain a conductive paste, the metal powder tends to become separated from the organic binder because the metal powder has a greater specific gravity than the organic binder. Moreover, when the product is to be used as a paint in the form of powder rather than in flakes, the resultant coating layer tends to become uneven.

In order to solve these problems, use of composite powders in which inorganic powders are coated with metal by means of electroless plating has been proposed. However, the method is detrimental because electroless plating is expensive and requires a highly complicated process.

Also, the metal-ceramic composite materials such as oxide dispersion strengthened alloys, heat resisting structural materials and damping materials can be obtained by mixing a ceramic powder with a metal powder and sintering the resultant mixture. Because of the difference in the specific gravity between the ceramic powder and the metal powder, it is extremely difficult to uniformly disperse the ceramic powder in the metal powder. Metal-ceramic composite materials in which the ceramic powder is uniformly dispersed in the metal powder can be obtained, provided that metal-ceramic composite powders in which metallic and ceramic components have been combined are sintered. As mentioned above, such metal-ceramic composite powders can be obtained by the electroless plating method, which is however defectively expensive and complicated in its process.

The present inventors have completed this invention in the course of their studies on inorganic ion exchangers by noting that ceramic-ceramic composite powders in which metal oxides are uniformly supported on the surface of an inorganic powder can be obtained by precipitating metal hydroxides, metal basic salts, or metallic salts uniformly on the surface of the inorganic ion exchanger and then calcining the resultant composite powders, and that metal-ceramic composite powders in which the inorganic powder is uniformly coated with the metal, can be obtained by reducing the metal oxides to metal.

SUMMARY OF THE INVENTION

An object of this invention is to provide an inexpensive and simple method of preparing ceramic-ceramic composite powders, and metal-ceramic composite powders in which any arbitrary amount of metal oxides or metal is supported on the surface of an inorganic powder. Another object of this invention is to provide a method of preparing ceramic-ceramic composite powders suitable as the starting material for production of ceramics, or ceramic-ceramic composite powders that are useful as functional ceramic powders, and to provide the powders obtained thereby. Another object of this invention is to provide a method of preparing metal-ceramic composite powders suitable as conductive or magnetic materials, and the powders obtained thereby. Still another object of this invention is to provide a method of preparing metal-ceramic composite powders suitable for preparing metal-ceramic composite materials such as oxide dispersion strengthened alloys, heat resisting structural materials and damping materials, and the powders obtained thereby.

In order to achieve these objects of this invention, the present first method for manufacturing ceramic composite powders includes the steps of; forming a suspension by mixing an inorganic powder having cation-exchange properties with a solution containing one or more metal ions, to conduct ion exchange with the metal ions on the surface of the inorganic powder; adding to the suspension a precipitant-forming material which releases at least an anion in a solution when heated or pressurized; heating or pressurizing the suspension to release the anion from the precipitant-forming material, and allowing the released anion to react with the metal ions to thereby precipitate metal hydroxides, metal basic salts or metallic salts on the surface of the inorganic powder; and thereafter heating the inorganic powder on which metal hydroxides, metal basic salts, or metallic salts are precipitated to convert the resultant precipitates into metal oxides to thereby synthesize ceramic-ceramic composite powders.

In a second embodiment of the present method, the metal oxides on the surface of the inorganic powder, obtained by the above first method, are subjected to reduction to convert the metal oxides into metal to synthesize metal-ceramic composite powders.

It is preferable to add an organic or inorganic compound, an oxidizer or a reducing agent, to the suspension in the above step for forming precipitates to control the precipitation rate, composition, particle form and degree of oxidation of the precipitates.

DESCRIPTION OF THE PREFERRED EMBODIMENT

Natural or artificial inorganic powders having a cation-exchange property to be used in this invention may be classified into those that are amorphous, and those that are crystalline. The amorphous inorganic ion-exchangers include various hydrate oxides, such as silica gel and alumina gel. The crystalline inorganic ion-exchangers include natural clay minerals, such as montmorillonite, vermiculite and beidellite, artificial clay minerals, aluminum silicate, sodium titanate, sodium uranate and zirconium phosphate. The inorganic powders to be used in this invention are not specifically limited so long as they are inorganic and have the cation-exchange property.

An inorganic powder having the cation-exchange property is added and mixed with a solution containing metal ions to cause ion exchange. One or more metal ions may be contained. The amount of this power added is in the range of from 0.1 grams to 80,000 grams against 100 grams of the metal ions in the solution calculated as elemental metal. To accelerate the ion exchange, treatments, such as, heating or pressurization may be conducted as the needs arises. The heating is to be conducted at a temperature in the range of from about room temperature to about 100° C. and pressurizing at the range of from about 1 to about 30 atms. This ion exchange treatment fixes the desired metal ions at the sites of ion exchange on the surface of the inorganic powder to thereby form a suspension.

An anion is then reacted with the metal ions in the suspension to produce precipitates. The precipitates are formed by adding to the suspension a precipitant-forming material that releases at least one anion when heated or pressurized. The amount of this addition is selected from the range of from about 10 mol to about 7000 mol against about 100 mol of the metal ions. The precipitant-forming material does not react with the metal ions as it is, but becomes hydrolyzed when heated or pressurized to release at least one anion, which in turn reacts with the metal ions to gradually form precipitates comprising metal hydroxides, metal basic salts, or metallic salts.

For the formation of precipitates by using the precipitant-forming material, the suspension added with the material is (a) heated at a temperature in the range of from about room temperature to about the boiling point; (b) pressurized at the range of from about 1 to about 150 atms, or (c) simultaneously heated and pressurized in the above ranges so that the precipitant-forming material in the suspension is uniformly and gradually decomposed to release the anion. Metal hydroxides, metal basic salts, or metallic salts are then gradually precipitated on the surface of the inorganic ion-exchanger. Thus, the nuclei grow on the fixed metal ions which are introduced on the surface of the ion-exchanger by ion exchange, followed by the precipitation at the nucleation sites.

The inorganic powder carrying metal hydroxides, metal basic salts, or metallic salts is extracted from the suspension by filtration or centrifugation. Upon heating the powder at a temperature in the range of from about 150° C. to about 1700° C. in the air, metal hydroxides, metal basic salts, or metallic salts are converted into metal oxides to form ceramic-ceramic composite powders.

The precipitant-equation material to be used in this invention is selected from urea, acetamide, formamide, various esters (dimethyl oxalate, diethyl oxalate, trimethylphosphoric acid, triethylphosphoric acid, dimethylsulfuric acid, diethylsulfuric acid), amidosulfuric acid, sulfur containing compounds (thioacetamide, thiourea, ammonium thiocarbanate) and trichloroacetate, etc.

The precipitant-forming material releases various anions by hydrolysis. For example, when an aqueous solution of urea is heated, urea is gradually hydrolyzed to cause the reaction shown in the following formula.

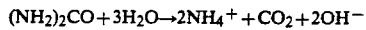

$$(NH_2)_2CO + 3H_2O \rightarrow 2NH_4^+ + CO_2 + 2OH^-$$

The above reaction produces anions, such as, $OH^-$ and $CO_3^{2-}$. if metal ions are present, these ions react with the anions to form precipitates comprising metal hydroxides, metal carbonates, or metal basic salts. Likewise, when an aqueous solution of trichloroacetate is heated, hydrolysis occurs to cause the reaction shown in the following equation.

$$2C_2Cl_3O_2^- + H_2O \rightarrow 2CHCl_3 + CO_2 + CO_3^{2-}$$

By this reaction anions, such as, $CO_3^{2-}$ are produced, and metal ions, if present, react with the anions to form precipitates comprising metallic carbonates, or metal basic salts.

Any substances that gradually form a precipitant by such reaction in a solution may be used as a precipitant-forming material in this invention. The method of forming the above precipitant is known as a homogeneous precipitation method and is described in the following references: (1) Quantitative Chemical Analysis, 4th edition, 1960, The Macmillan Company, (2) A.G. Walton: The Formation and Properties of Precipitates, 1967, John Wiley & Sons, (3) F.H. Firsching: Advanced Anal. Chem. Inst. 4, page 1, 1965, (4) L. Gordon, M.L. Salutsky and H.H. Willard: Precipitation from Homogeneous Solution, 1959, John Wiley, (5) E. Matijević: Acc. Chem. Res. 14, page 22, 1981.

When the precipitant-forming material is added to the solution to form the precipitant to thereby produce precipitates, an organic or inorganic compound, an oxidizer or a reducing agent may also be added to the solution in order to control the precipitation rate, composition, particle form or degree of oxidation of the precipitates.

By thus uniformly precipitating metal the hydroxides, metal basic salts, or metallic salts on the surface of inorganic the powders having the cation-exchange property, composite powders are formed. When the precipitates are converted into metal oxides by heating the composite powders at not less than 100° C. in the air, ceramic-ceramic composite powders can be obtained.

Alternatively, by reducing the ceramic-ceramic composite powders, or the composite powders comprising metal hydroxides, metal basic salts, or metallic salts, in the gas phase or in the liquid phase to convert precipitates into metal, metal-ceramic composite powders can be obtained. A typical method of reduction in the gas phase comprises calcining in the hydrogen gas at a temperature ranging from about 100 to about 1800° C. As for the method in the liquid phase, ceramic-ceramic composite powders may be reduced in the liquid phase comprising hydrazine or sodium boron hydride.

According to this invention method, an arbitrary amount of metal oxide or metal may be supported on the surface of the inorganic powder by utilizing the ion-exchange properties of the powder. This enables the production of ceramic-ceramic composite powders and metal-ceramic composite powders simply and at a low cost.

This invention method further enables production of ceramic-ceramic composite powders that are suitable as starting materials for production of ceramics, or of ceramic-ceramic composite powders that are useful as various functional ceramic powders. This method also achieves synthesis of metal-ceramic composite powders that are useful as conductive paints, magnetic materials, catalysts, and toners, etc. Metal-ceramic composite powders suitable for the production of metal-ceramic composite materials, such as oxide dispersion strengthened alloys, damping materials, and heat resisting structural materials may also be synthesized.

This invention will be described more specifically referring to the following examples.

EXAMPLE 1

To 3 liters of 0.3 M(mol/l) of $Ni(No_3)_2$ aqueous solution was added 1 g of sodium fluoride tetrasilicic mica ($NaMg_{2.5}Si_4O_{10}F_2$, Topy Industries Ltd.) which is a crystalline ion exchanger. The resultant mixture was stirred for 5 days to cause ion exchange and $Ni^{2+}$ ion was fixed on the mica surface.

To this suspension was added 162 g of urea as a precipitant-forming material. The resultant suspension was heated at 95° C. for 24 hours while stirring to hydrolyze the urea and to allow the Ni ions present in the suspension to precipitate as nickel basic salts. The suspension was filtered to extract the resultant powders. The powders were then dried at room temperature. Observation by means of an electron microscope indicated that the precipitates were uniformly formed on the mica surface. Chemical analysis revealed that the weight ratio of Ni to mica (Ni/mica) in the composite powders were 41.2.

By calcining the composite powders at 700° C. for 2 hours in air, NiO-artificial mica (ceramic-ceramic) composite powders were obtained By further heating the resultant composite powders at 400° C. for 2 hours in a hydrogen gas atmosphere, NiO was reduced and Ni-artificial mica (metal-ceramic) composite powders in which the mica surface was uniformly coated with Ni were obtained.

EXAMPLE 2

The Ni-artificial mica (metal-ceramic) composite powders obtained in Example 1 were subjected to compression molding at 8 tons/cm², and the molded body was sintered at 700° C. for 2 hours in a hydrogen gas stream. Nano-composite materials in which artificial mica particles (each diameter: 1–10 μm, each thickness: several 10 Å) were uniformly dispersed in Ni were obtained. The composite materials were found to have a remarkable vibration damping effect (damping capacity: $60 \times 10^{-3}$) compared to other conventional materials.

EXAMPLE 3

To 2 liters of 0.2 M(mol/l) of $Cu(NO_3)_2$ aqueous solution was added 2 g of Na-montmorillonite powder (product of Aterazawa Mine, Yamagata Pref.) which is a natural ion exchanger. The resultant mixture was stirred for 5 days for ion exchange and then $Cu^{2+}$ ion was fixed on the montmorillonite powder surface.

To this suspension were added 54 g of formamide as a precipitant-forming material. The resultant suspension was heated at 90° C. for 48 hours while stirring to hydrolyze formamide and allow $Cu^{2+}$ ions present in the suspension to precipitate as basic salts. The suspension was filtered to extract the resultant powders. The powders were dried at room temperature. Observation by means of an electron microscope indicated that the precipitates were uniformly formed on the montmorillonite surface. Chemical analysis revealed that the weight ratio of Cu to montmorillonite (Cu/montmorillonite) in the composite powders was 7.12.

By calcining the composite powders at 500° C. in air and further heating the resultant composite powders at 400° C. for 2 hours in a hydrogen gas atmosphere, CuO was reduced and the metal-ceramic composite powders in which the montmorillonite surface was uniformly coated with Cu were obtained. The specific gravity of the powder was 6.6.

EXAMPLE 4

The metal-ceramic composite powders obtained in Example 3 were kneaded with an acrylic resin coating base (Kansai Paint Co., Ltd., No. 2026) to form a paint wherein the powder constituted 25 vol. %. This paint was spread on an ABS substrate with a thickness of 30 μm. The electrical resistance of the substrate surface was 0.1 Ω/□, indicating an excellent conductivity, and its specific gravity was less than that of Cu (8.9). The thus obtained composite powders were lightweight flakes with excellent conductivity.

EXAMPLE 5

Silica gel (Wako Pure Chemical Industries Ltd.) was immersed in 1 N hydrochloric acid for 24 hours to remove iron, washed with water for many hours and then dried by air to obtain an amorphous silica gel having the cation-exchange property.

To 2.5 liters of 0.1 M(mol/1) of aluminum chloride aqueous solution were added 5 g (based on $Sio_2$) of the thus obtained silica gel. The resultant mixture was stirred for 5 days to allow aluminum ion to be fixed on the silica gel surface by ion exchange.

To this suspension were added 500 g of acetamide as a precipitant-forming material and 30 g of ammonium sulfate. The suspension was heated at 95° C. for 24 hours. Then, acetamide was hydrolyzed to cause the aluminum to precipitate, and the suspension was filtered to extract the resultant powders. The powders were dried at room temperature. Observation by means of electron microscope indicated that the precipitates were uniformly formed on the silica gel surface. Its chemical analysis revealed that the precipitates comprised a basic sulfate of aluminum and that the weight ratio of $Al_2O_3$ to $SiO_2$ ($Al_2O_3/Sio_2$) was approximately 3/2.

When the composite powders were calcined at 500° C. for 5 hours in air, $Al_2O_3$-$SiO_2$ (ceramic-ceramic) composite powders were obtained.

EXAMPLE 6

The $Al_2O_3$-$SiO_2$ composite powder obtained in Example 5 was subjected to compression molding under a pressure of 1 ton/cm$^2$. The molded body was sintered at 1550° C. for 12 hours in the air. X-ray diffractometry revealed that the product was mullite (3$Al_2O_3$ 2$SiO_2$). The bending strength of this sintered body was 17 kg/mm$^2$ and the compressive strength was 50 kg/mm$^2$, which properties are superior to those of the conventional products obtained by mixing $Al_2O_3$ powders with $SiO_2$ (bending strength: 10-15 kg/mm$^2$, compressive strength: 38-45 kg/mm$^2$).

EXAMPLE 7

To 3 liters of 0.1 M(mol/l) of a silver nitrate solution was added 1 g of silica gel (in terms of $SiO_2$) obtained similarly to Example 5. The resulting mixture was stirred for 2 days to cause ion exchange.

To this suspension was added 150 g of sodium trichloroacetate as a precipitant-forming material. This suspension was heated at 90° C. for 24 hours to hydrolyze the sodium trichloroacetate salts and allow Ag to precipitate in the suspension. The suspension was filtered to extract the resultant powders. The powders were dried at room temperature and studied by X-ray diffractometry to reveal that the precipitates comprised silver carbonates. Observation by means of electron microscope indicated that the precipitates were uniformly formed on the $SiO_2$ surface.

When the resulting powders were sintered at 500° C. for 2 hours in air and reduced at 400° C. for 2 hours in a hydrogen gas atmosphere, metal-ceramic composite powders in which the $SiO_2$, surface was completely coated with Ag were obtained. Chemical analysis revealed that the weight ratio of $SiO_2$ to Ag (Ag/$SiO_2$) was 28.

EXAMPLE 8

The composite powders obtained in Example 7 were subjected to compression molding under a pressure of 1 ton/cm$^2$. The molded body was sintered at 500° C. for 4 hours in a hydrogen gas atmosphere to obtain an Ag composite dispersed with $SiO_2$. Its electrical characteristics were comparable to those of Ag. Its modulus of elasticity was 15×10$^6$ psi and tensile strength was 70 kg/mm$^2$, which properties are superior to 1-5×10$^6$ psi and 25 kg/mm$^2$, respectively, of pure Ag.

What is claimed is:

1. A method for preparing a ceramic composite powder comprising the steps of:
   a. admixing an inorganic powder having cation-exchange properties with a solution containing a metal ion to form a suspension and effect ion exchange of the metal ion to the surface of the inorganic powder;
   b. adding a precipitant to the suspension which releases an anion capable of forming a precipitate with the metal ion when heated or pressurized;
   c. releasing and reacting the anion with the metal ion by heating, pressurizing, or simultaneously heating and pressurizing the solution to precipitate a hydroxide, basic salt, or salt of the metal onto the surface of the inorganic powder; and, then,
   d. heating the inorganic powder with the precipitate thereon to convert the precipitate to a metal oxide.

2. The method of claim 1 wherein the inorganic powder is amorphous.

3. The method of claim 1 wherein the inorganic powder is crystalline.

4. The method of claim 1 wherein the inorganic powder is selected from the group consisting of hydrate oxides.

5. The method of claim 3 wherein the inorganic powder is selected from the group consisting of natural clay minerals, aluminum silicate, sodium titanate, sodium uranate, and zirconium phosphate.

6. The method of claim 1 wherein the amount of powder added in step a) is in the range of about 0.1 to 80000 grams against 100 grams of the metal ions in the suspension calculated as elemental metal.

7. The method of claim 1 wherein the suspension is heated to accelerate the ion exchange.

8. The method of claim 1 wherein the suspension is subjected to pressure to accelerate the ion exchange.

9. The method of claim 1 wherein the amount of precipitant added is from about 10 mol to 7000 mol per 100 mol of the metal ions.

10. The method of claim 1 wherein the precipitant is selected from the group consisting of urea, acetamide, formamide, esters, amidosulfuric acid, sulfur containing compounds and trichloroacetate.

11. The method of claim 1 wherein an organic or inorganic compound, an oxidizer, or a reducing agent is added to the suspension.

12. The method of claim 1 wherein metal oxides are present on the surface of the inorganic powder and are reduced to metal to produce a metal-ceramic composite powder.

13. Ceramic-ceramic composite powders produced according to the method of claim 1 having metal oxides uniformly formed on the surface of the inorganic powder.

14. Metal-ceramic composite powders produced by the method of claim 12 having metal uniformly formed on the surface of the inorganic powder.

15. The method of claim 12 wherein the metal oxides are reduced in a gas phase.

16. The method of claim 12 wherein the metal oxides are reduced in a liquid phase.

17. The method of claim 12 wherein the inorganic powders are reduced by calcining in hydrogen gas at a temperature in the range from about 100 to 1800° C.

18. The method of claim 12 wherein the inorganic powder is reduced with hydrazine or sodium boron hydride.

* * * * *